O. E. CHAPMAN.
DEVICE FOR DESTROYING FLIES.
APPLICATION FILED JUNE 12, 1912.
1,081,364.
Patented Dec. 16, 1913.
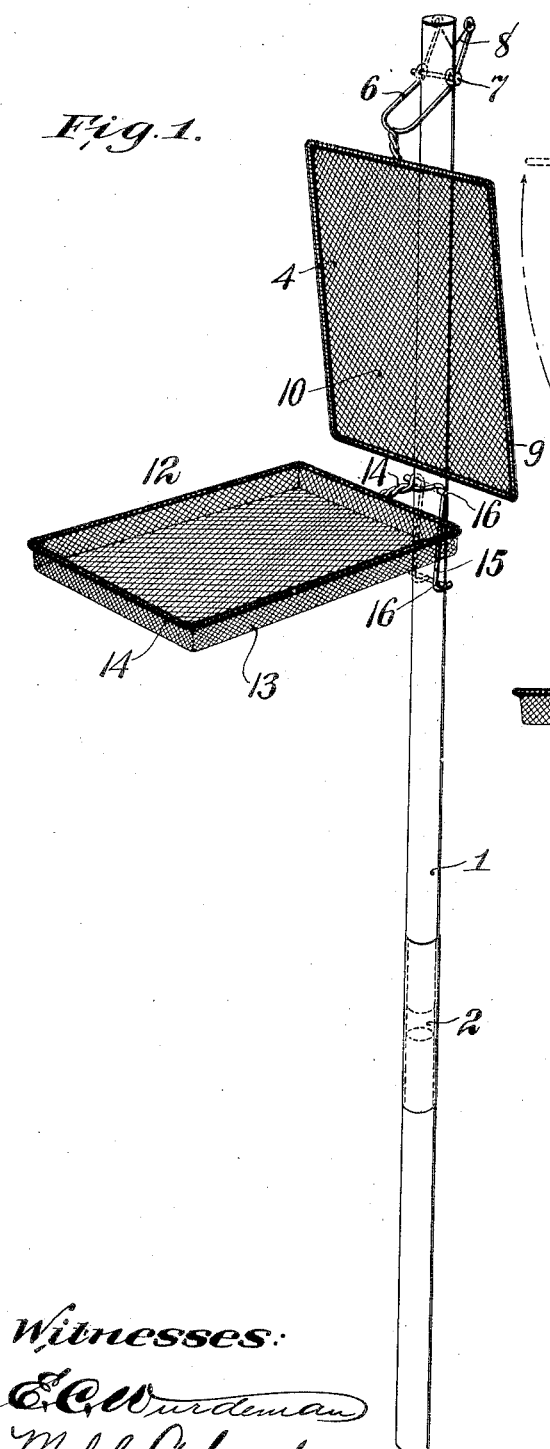
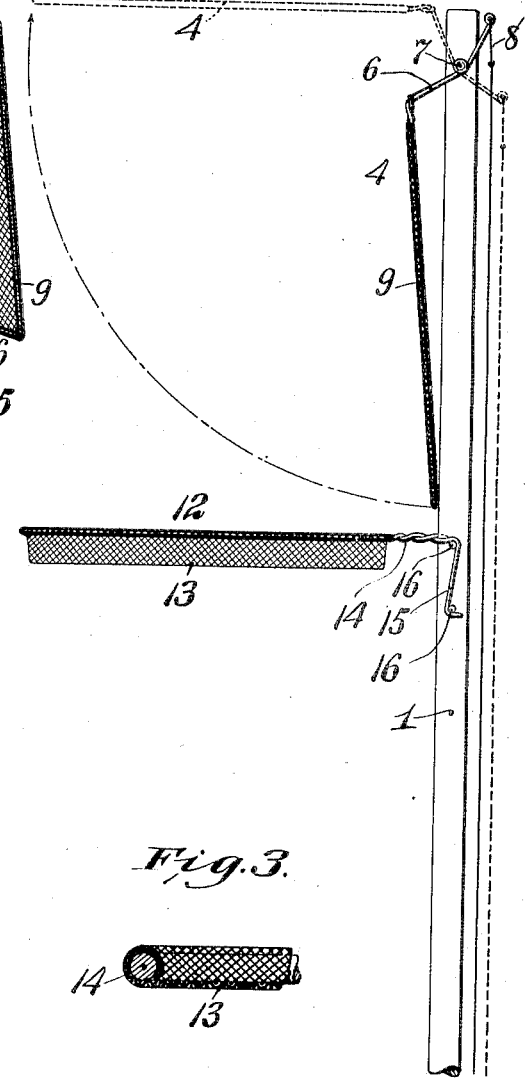
Witnesses:
Inventor:
Oliver E. Chapman
by his attorneys

UNITED STATES PATENT OFFICE.

OLIVER E. CHAPMAN, OF SHARON, MASSACHUSETTS.

DEVICE FOR DESTROYING FLIES.

1,081,364.   Specification of Letters Patent.   Patented Dec. 16, 1913.

Application filed June 12, 1912. Serial No. 703,188.

*To all whom it may concern:*

Be it known that I, OLIVER E. CHAPMAN, a citizen of the United States, residing at Sharon, in the county of Norfolk and State of Massachusetts, have invented certain new and useful Improvements in Devices for Destroying Flies; and I do hereby declare the following to be a full, clear, and exact description of the invention, such as will enable others skilled in the art to which it appertains to make and use the same.

The present invention relates to devices for destroying flies and other insects, and more particularly to devices of this character which are arranged to strike and kill the insect when at rest upon a wall, ceiling or other surface. Devices of this character are employed largely for destroying the ordinary form of house fly and it is desirable that the instrument may be positioned and steadied preparatory to striking without causing the fly to move and that a quick sharp blow may then be delivered to kill the fly.

The object of the present invention is to provide a simple device of this character which is efficient in its operation and of considerable range, and which may be readily manipulated to destroy the flies without causing them to move from their position upon a wall.

With this object in view, the several features of the invention consist in certain novel features of construction, combinations and arrangements of parts hereinafter described and claimed, the advantages of which will be obvious to those skilled in the art from the following description.

In the accompanying drawings illustrating the preferred form of the invention; Figure 1 represents an elevation of the improved device and illustrates the bat in its lowered or inoperative position; Fig. 2 is a side elevation of the device illustrating in dotted lines the position of the bat when in a striking position; and Fig. 3 is a detail illustrating a cross section of the bat and showing the manner in which the screen is secured to the supporting frame.

It is an important requisite in devices of this character that they may be positioned and supported preparatory to striking a blow in such a manner that the fly or other insect to be killed is not alarmed and caused to move away. To this end the present invention comprises a supporting rod having its upper end arranged to rest against the wall at a point removed from the fly and a striking member supported upon the rod and movable relative thereto into a striking position as the device is supported and steadied against the wall. The striking member is provided with a plane face of a comparatively large area and is supported upon the rod in such a manner that when in striking position the face of the member is arranged in parallel relation with the wall, thus causing the member to engage and kill the fly upon any portion of its face. In the simplest and most efficient form of the invention which has yet been devised, a bat is pivotally connected to the upper portion of the rod and is provided with an operating cord arranged to be conveniently manipulated by the operator to swing the bat into a striking position.

The supporting rod is indicated at 1 and is conveniently jointed as at 2 to make it extensible in length and enable the device to be employed either at a long or short range. The upper end of the supporting rod is arranged to rest against the surface upon which the fly is located and a striking member or bat 4 is pivotally connected to the rod below its upper end and is arranged to swing into the plane of the upper face of the rod to position the face of the member in parallel relation to the wall when in a striking position. The bat 4 is provided with a supporting arm 6 extending therefrom and pivotally connected intermediate its ends by a pin 7 to the rod 1. The supporting arm is actuated to swing the bat into a striking position by a suitable operating cord 8 loosely connected at its lower end to the rod and arranged to be conveniently manipulated by the operator when desired. The frame of the bat is conveniently formed of a single length of wire which is bent and twisted to form a rectangular frame 9 having the supporting arm 6 extending therefrom. The face of the bat is constructed of a close mesh screen 10 which is located on the under side of the frame and is rolled about the frame to secure it thereto, as shown clearly in Fig. 3. With this construction the face of the bat is spaced from the wall, thus causing the fly to be struck and killed without crushing it against the wall. In order to support the bat in parallel relation to the wall when in a striking position, the wire forming the arm 6 is bent, as shown clearly in Figs. 1 and 2, supporting the bat with its fulcrum located at one side of the plane of the striking face.

From the foregoing description it will be noted that the bat is offset from the rod a considerable distance when in striking position, enabling the upper end of the rod to be placed against the wall at a point removed from the fly to position and steady the device preparatory to striking.

In order to receive the dead flies, a receptacle 12 is secured to the rod 1 beneath the striking member 4. This receptacle is in the form of a shallow tray constructed of a close mesh screen 13 secured to a wire frame 14 having an arm 15 which is bent into an S shape and secured to the rod 1 by a plurality of pins 16, as shown clearly in Figs. 1 and 2. The arm 15 is formed by the two ends of the wire and these two ends extend on opposite sides of the rod 1. The ends of the wire forming the arm 15 pass over the upper pin 16 and under the lower pin 16, so that the receptacle 12 is secured to the rod in such a manner that it can be readily removed and replaced. After each actuation, the rectangular frame 9 is allowed to drop to the position indicated in Figs. 1 and 2, and in dropping to this position the flies which have been killed by the upward movement of the frame are discharged into the receptacle 12 so that at the next upward movement of the frame 9 no dead flies remain on the frame to be crushed against the wall or ceiling.

The device illustrated in the drawings is particularly useful in killing flies which are at rest on the ceiling of a room, the frame 9 in such case being raised into a horizontal position, as indicated in dotted lines in Fig. 2, at right angles to the rod 1. The device may, however, be used to kill the flies on the wall of the room or on a surface to which the rod 1 cannot be conveniently presented at right angles. To allow the frame 9 to swing into parallel relation to the wall in case the rod 1 is not placed at right angles to the wall, the supporting arm 6 of the frame is preferably bent into such shape that the frame can swing beyond the dotted line position of Fig. 2.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:—

1. An insect destroyer having, in combination, a supporting rod having its upper end arranged to rest against the wall at a point removed from the insect to be destroyed in order to position and steady the device, a striking member having a plane face supported upon the upper portion of the rod and arranged in parallel relation with the wall at the completion of the striking operation, and an operative connection for moving the striking member relative to the rod into a striking position.

2. An insect destroyer having, in combination, a supporting rod, a bat pivotally connected to the rod below the upper end and having the fulcrum located at one side of the plane of the striking face in order to position the bat substantially parallel with the surface upon which the insect is located at the completion of the striking operation, and an operating cord connected to the bat.

3. An insect destroyer having, in combination, a supporting rod, a bat having a striking face, a curved arm extending from the bat and fulcrumed upon the supporting rod at one side of the face of the bat and intermediate its ends to support the bat at the completion of the striking operation parallel to the surface upon which the insect is located, and an operating connection secured to the free end of the arm.

4. An insect destroyer having, in combination, a supporting rod, a bat pivotally connected to the upper portion of the rod and arranged to swing upwardly into a striking position, a receptacle secured to the rod beneath the bat and arranged to receive the insects which have been killed as they slide off the bat when the bat is swung into a retracted position, and a cord operatively connected to the bat and arranged to be readily manipulated by the operator to swing the bat into a striking position.

5. An insect destroyer having, in combination, a supporting rod, a frame having an arm extending therefrom and pivotally connected intermediate its ends to the rod, a close mesh screen secured to the under side of the frame to prevent crushing the insects, and an operating cord connected to the free end of the arm and arranged to be readily manipulated by the operator to swing the bat into a striking position.

OLIVER E. CHAPMAN.

Witnesses:
FRED O. FISH,
GEORGE E. STEBBINS.